United States Patent
Kosbab et al.

(10) Patent No.: US 10,284,452 B2
(45) Date of Patent: May 7, 2019

(54) VOIP QUALITY TEST VIA MANUAL PHONE CALL INTO VOIP MONITORING SYSTEM

(71) Applicant: AirMagnet, Inc., Santa Clara, CA (US)

(72) Inventors: Bruce J. Kosbab, Colorado Springs, CO (US); Brandon Shannon, Colorado Springs, CO (US)

(73) Assignee: AirMagnet, Inc., Santa Clara, CA (US)

( * ) Notice: Subject to any disclaimer, the term of this patent is extended or adjusted under 35 U.S.C. 154(b) by 193 days.

(21) Appl. No.: 14/818,020

(22) Filed: Aug. 4, 2015

(65) Prior Publication Data

US 2017/0041210 A1  Feb. 9, 2017

(51) Int. Cl.
| | |
|---|---|
| H04W 4/14 | (2009.01) |
| H04L 12/26 | (2006.01) |
| H04L 29/06 | (2006.01) |
| H04M 3/22 | (2006.01) |
| H04M 7/00 | (2006.01) |

(52) U.S. Cl.
CPC .............. *H04L 43/12* (2013.01); *H04L 43/50* (2013.01); *H04L 65/1069* (2013.01); *H04L 65/1083* (2013.01); *H04L 65/80* (2013.01); *H04M 3/2236* (2013.01); *H04W 4/14* (2013.01); *H04L 43/06* (2013.01); *H04M 7/006* (2013.01)

(58) Field of Classification Search
CPC ....... H04L 65/80; H04L 43/087; H04L 45/00; H04L 43/50; H04L 41/5087; H04L 43/0852; H04L 43/08; H04L 43/0829; H04L 12/2697
See application file for complete search history.

(56) References Cited

U.S. PATENT DOCUMENTS

| | | | |
|---|---|---|---|
| 8,660,016 B2 | 2/2014 | Punreddy et al. | |
| 2002/0015387 A1* | 2/2002 | Houh ..................... | H04L 43/50 370/250 |
| 2005/0271029 A1* | 12/2005 | Iffland ..................... | H04L 43/50 370/348 |
| 2006/0203801 A1* | 9/2006 | Li ........................ | H04L 41/5087 370/352 |
| 2007/0127391 A1* | 6/2007 | Goodman ........... | H04L 41/5003 370/252 |
| 2009/0161658 A1* | 6/2009 | Danner .................. | H04L 12/66 370/352 |
| 2010/0172251 A1* | 7/2010 | Adam .................... | H04L 41/12 370/252 |
| 2011/0103370 A1* | 5/2011 | Igval ...................... | G10L 25/78 370/352 |
| 2014/0211633 A1 | 7/2014 | Efrati | |
| 2016/0028881 A1* | 1/2016 | Assem ............... | H04M 3/2227 370/252 |

* cited by examiner

*Primary Examiner* — Jung Liu
(74) *Attorney, Agent, or Firm* — Locke Lord LLP; Scott D. Wofsy; Christopher J. Capelli

(57) ABSTRACT

A system for testing a Voice over IP (VoIP) network is provided. The system includes a monitoring probe connected to the VoIP network. The monitoring probe is configured to answer an incoming call and monitor the VoIP network, in response to receiving the incoming call. The monitoring probe is also configured to terminate the incoming call after a pre-defined period of time. The monitoring probe is further configured to send a quality report indicative of VoIP network performance. The system further includes a mobile device for placing the call to the monitoring probe.

18 Claims, 3 Drawing Sheets

VOIP QUALITY TEST VIA MANUAL PHONE CALL INTO VOIP MONITORING SYSTEM

FIELD OF THE INVENTION

Embodiments of the present invention relate generally to a voice over Internet Protocol (VoIP) network, and more particularly, to testing the VoIP network to determine the quality of the VoIP network.

BACKGROUND OF THE INVENTION

The conventional telephony network allows users to communicate with each other through a central system of switches, which can be referred to as a telephone exchange. The telephone exchanges provide electrical or optical switches to connect users and allow communication. The conventional telephony network is often referred to as a public switched telephone network (PSTN). The switches and other equipment necessary to make a connection can be located, for example, in central offices (COs) and in customer premises. The PSTN can have local exchanges that allow a user to call another user of the PSTN through COs of the local exchange. The PSTN can also have long lines that allow long distance call transmission, such that a user can call another user on the PSTN that is not part of the local exchange. In this case, the call may be routed through multiple COs until the call reaches the called parties local exchange.

Voice over Internet Protocol (VoIP) provides an alternative to the conventional telephone exchanges. VoIP is a technology that allows a user to make telephone calls using an Internet connection instead of a conventional phone line and the conventional exchanges. VoIP uses the Internet as the transmission medium for telephone calls by sending voice data in packets using an Internet Protocol (IP) rather than by traditional circuit transmissions of the PSTN. A VoIP call may be carried by multiple routers over the Internet. VoIP is an attractive alternative to conventional telephony systems since a single network can be used to transmit both voice and data.

Typically, a VoIP network is available to users with no testing of the quality of the VoIP network. The lack of testing of a VoIP network can result in low quality communications, which can be inadequate for users of the VoIP network.

It is, therefore, desirable that a VoIP network be tested prior to the availability of the VoIP network to the users. Such testing would ensure that users enjoy a high level of quality from the VoIP network. It is further desirable to have immediate feedback on both the qualitative as well as quantitative measures of the VoIP network.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a system for testing a Voice over IP (VoIP) network is provided. The system includes a monitoring probe connected to the VoIP network. The monitoring probe is configured to answer an incoming call and monitor the VoIP network, in response to receiving the incoming call. The monitoring probe is also configured to terminate the incoming call after a pre-defined period of time. The monitoring probe is further configured to send a quality report indicative of VoIP network performance. The system further includes a mobile device for placing the call to the monitoring probe.

In another aspect, a monitoring probe communicatively coupled to a VoIP network is provided. The monitoring probe includes logic integrated with and/or executable by a processor. The logic is configured to answer an incoming call. The logic is further configured to monitor the VoIP network in response to receiving the incoming call. The logic is yet further configured to terminate the incoming call after a pre-defined period of time. Additionally, the logic is configured to send a quality report indicative of VoIP network performance.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
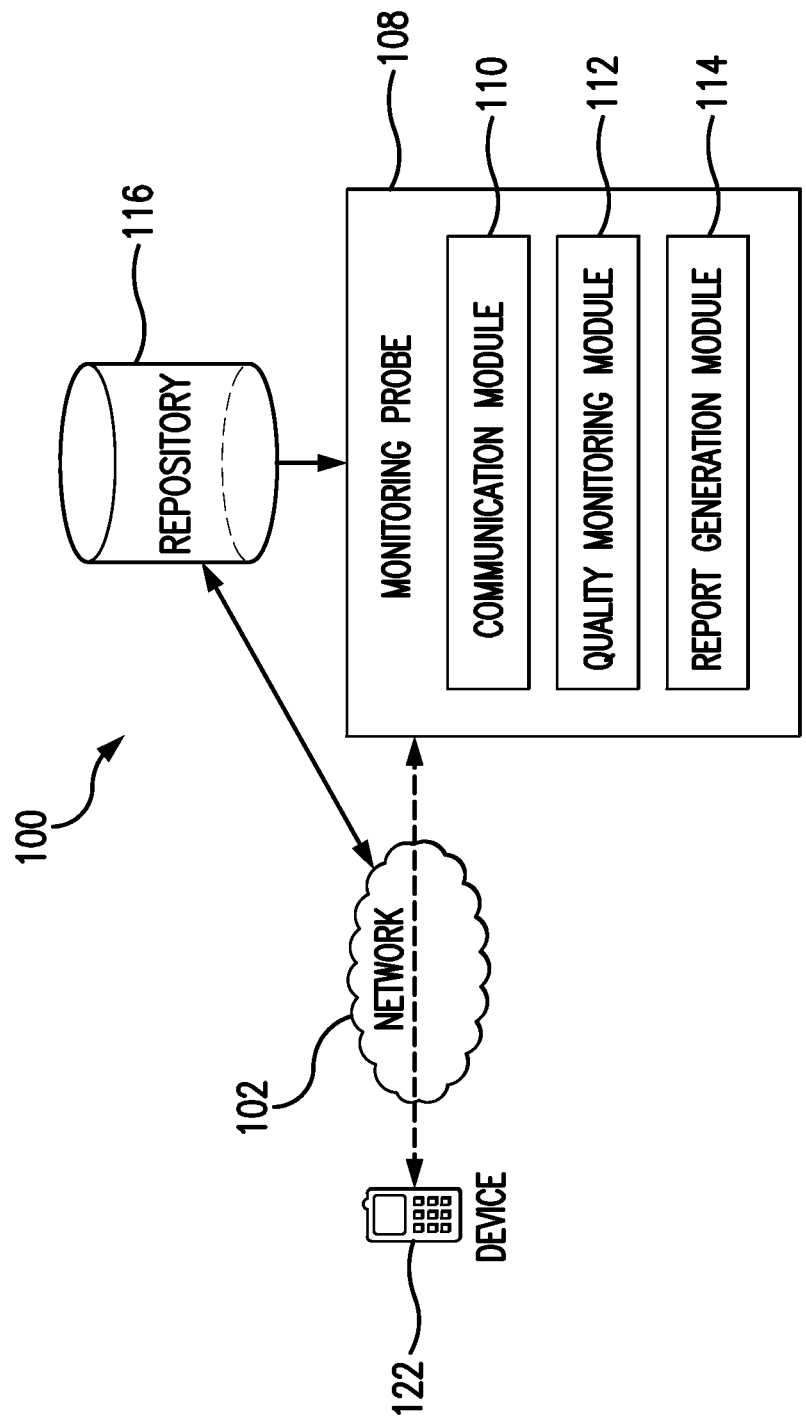
FIG. 1 is an illustration depicting a system for testing a VoIP network according to an embodiment of the present invention.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

Embodiments of the present invention generally relate to VoIP calls. Assessing and managing the VoIP network presents an entirely unique challenge from monitoring traditional data applications. As an example, there is a significant difference between an email taking 15 seconds to be sent and a garbled VoIP phone conversation. Embodiments of the present invention enable testing of a VoIP network and troubleshooting various VoIP connectivity issues by network administrators and other personnel using various monitoring components. The testing can determine the quality of the transmission network before an internet VoIP service is put into production. According to one embodiment, a VoIP network tester can place a call to a VoIP monitoring component, which acts as a real phone on the VoIP system, and then, after the call is terminated, can automatically receive an analytical report indicative of the measured quality of the monitored call on the same device that initiated the test.

FIG. 1 is an illustration depicting a system for testing a VoIP network in accordance with one or more embodiments of the present invention. The monitoring system 100 comprises a VoIP network 102, a client device 122 for use on VoIP network 102, one or more monitoring probes 108 deployed in the VoIP network 102 and a repository 116 for storing various quality assessment measurements.

According to some embodiments of the present invention, the network 102 is a VoIP network, or any compatible packet based network. It should be noted, monitoring solutions for VoIP traffic are typically based on packet flow analysis of data streams, such as Real-time Transfer Protocol ("RTP") streams, which are used to transfer speech over IP networks. Typically, this analysis can be performed either as an integral part of an endpoint VoIP device like an IP-phone. According to the embodiment illustrated in FIG. 1, the monitoring probe 108 is deployed in the VoIP network 102 as an endpoint device having a combination of software and hardware components and may include one or more software modules, such as, but not limited to, a communication module 110, a quality monitoring module 112 and a report generation module 114, as discussed below. According to an embodiment of the present invention, when a monitoring probe 108 is permanently or semi-permanently installed on VoIP network 102, provision is made to assign a unique identifier to each monitoring probe 108, so as to make it possible for a VoIP testing personnel to place a phone call to one of the monitoring probes 108 deployed in the VoIP network 102. Thus, advantageously, VoIP testing personnel may perform VoIP quality tests merely by placing telephone calls from their mobile device (referred to hereinafter as a tester device 122). In various embodiments, the tester device 122 may be a mobile phone, a land-line device connected to a PSTN network, another VoIP device, a computer telephony software application, or any other device adapted for use on a telecommunications network.

Initially, a user of the tester device 122 places a call over the network 102 to a target monitoring probe 108 by entering a phone number associated with the monitoring probe 108. In some embodiments, the call may be rerouted through various network devices located in network 102. According to some embodiments, after the call is received at the monitoring probe 108, the communication module 110 answers the incoming call.

In some embodiments, at this stage, the communication module 110 may also play an audio message to the tester device 122. In response to receiving the incoming call, the communication module 110 transmits a notification to the quality monitoring module 112 to start monitoring an established VoIP session between the tester device 122 and the monitoring probe 108. A monitored VoIP session may be characterized by attributes, such as, but not limited to, the sequence and timing of exchanged messages, the time relationship between the media stream(s) and the corresponding signaling streams, and the like. As the monitored VoIP session progresses, packet flow analysis can be a very CPU intensive task for the monitoring probe 108, and the results have to be stored somewhere. According to an embodiment of the present invention, the monitoring probe 108 may have somewhat limited CPU resources and disk space. Because of these limitations, the monitoring system 100 may further include a repository for storing acquired and/or analyzed data. In one embodiment, centralized repository 116 may be connected to the VoIP network 102. Accordingly, at least in some embodiments, the acquired monitoring data is stored by the quality monitoring module 112 in the repository 116. It is noted that after a predetermined period of time, the communication module 110 terminates the VoIP session between the tester device 122 and the monitoring probe 108.

As the monitored VoIP session terminates in the network 102, the report generation module 114 receives a notification that a monitoring session has been concluded. Once the report generation module 114 receives such notification, the report generation module 114 generates a report containing various Quality of Service (QoS) metrics recorded and accumulated during the VoIP session between the tester device 122 and the monitoring probe 108 as described below. According to some embodiments, the generated report is stored in the tester's (i.e., user of the tester device 122) account for later reference. In addition, the report generation module 114 notifies the communication module 110 once the QoS report is generated, which in turn transmits the generated report to the tester device 122, for example, as a text message.

The tester device 122 can be configured to receive text messages as well as other types of notifications. In addition, according to some embodiments, the communication module 110 determines the specifications of the tester device 122 and transmits only those notifications which the tester device 122 is capable of receiving, for example, email messages only, or any combination of notification types. If the tester device 122 is capable of receiving and presenting various types of VoIP performance parameters, the tester device 122 can be configured to display all parameters, or to display those parameters preferred by the user of the tester device 122.

Figure 2:
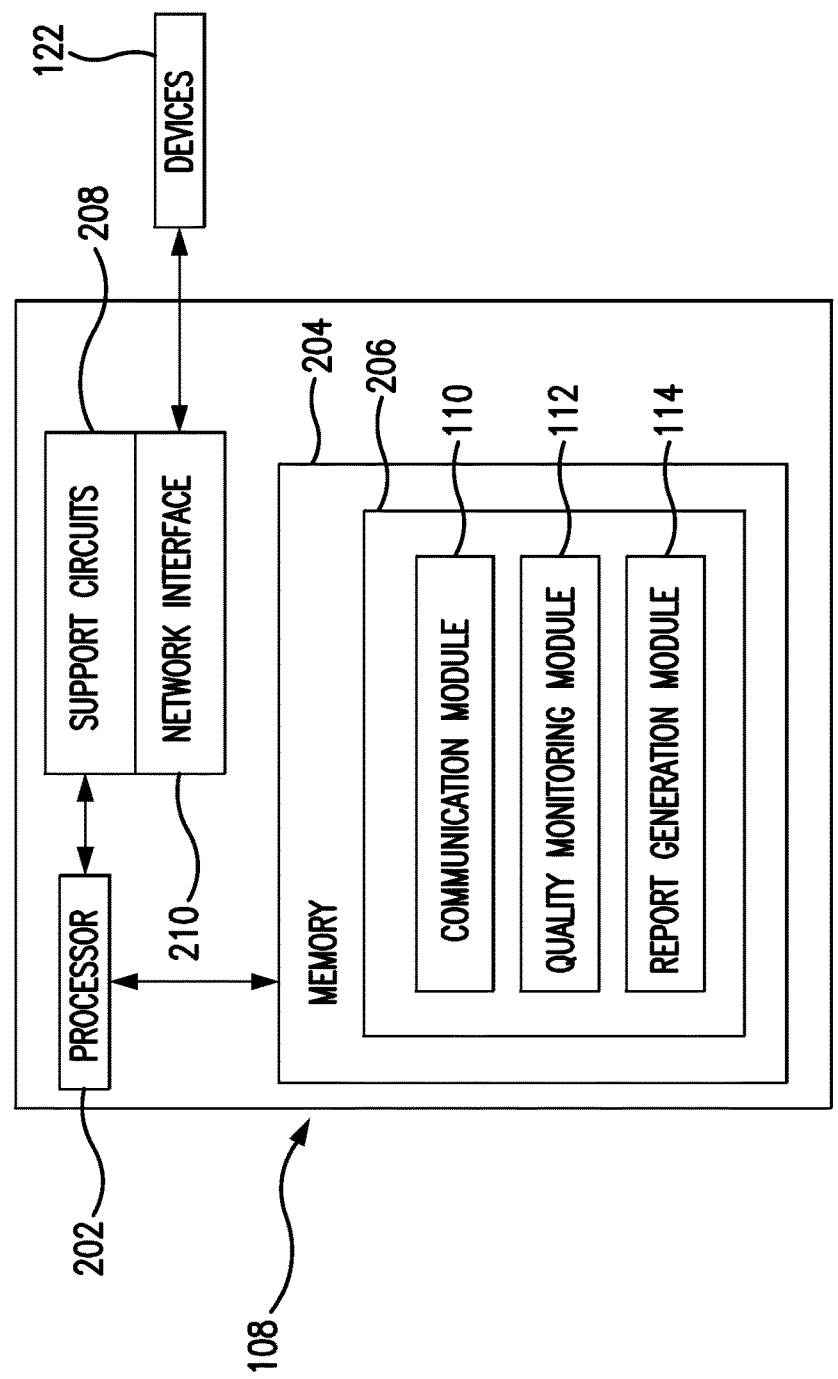
FIG. 2 is a block diagram of the monitoring probe of FIG. 1 in accordance with an embodiment of the present invention.

FIG. 2 depicts an implementation of the monitoring probe 108 of FIG. 1 in accordance with at least one embodiment of the present invention. The monitoring probe 108 includes a processor 202, various support circuits 208, and memory 204. The processor 202 may include one or more microprocessors known in the art. The support circuits 208 for the processor 202 include conventional cache, power supplies, clock circuits, data registers, network interface 210, and the like. The network interface 210 may be directly coupled to the memory 204 or coupled through the support circuits 208. The network interface 210 allows the communication with the devices 122 and the repository 116. The network interface 210 may also be configured for communication with input devices and/or output devices such as various storage devices, mouse, keyboard, display, video and audio sensors, and the like. In one embodiment, the monitoring probe 108 may be a Power over Ethernet ("PoE") device. PoE may refer to PoE as defined in any suitable standard relating to PoE, such as IEEE 802.3x, where x represents any value of a standard relating to PoE, for example, x=af. In such embodiment, the network interface 210 may include one or more PoE ports and the support circuitry 208 may include an internal PoE driver, for example.

The memory 204, or computer readable medium, stores processor-executable instructions and/or data that may be executed by and/or used by the processor 202. These processor-executable instructions may comprise firmware, software, and the like, or some combination thereof. Modules 206 having processor-executable instructions that are stored in the memory 204 may include, but are not limited to, communication module 110, quality monitoring module 112 and report generation module 114.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The monitoring probe 108 may be programmed with one or more operating systems, which may include OS/2, Java Virtual Machine, Linux, SOLARIS, UNIX, HPUX, AIX, WINDOWS, IOS, ANDROID among other known platforms. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the monitoring probe 108, partly on the monitoring probe 108, as a stand-alone software package, or partly on the monitoring probe 108 and partly on a remote device.

Figure 3:
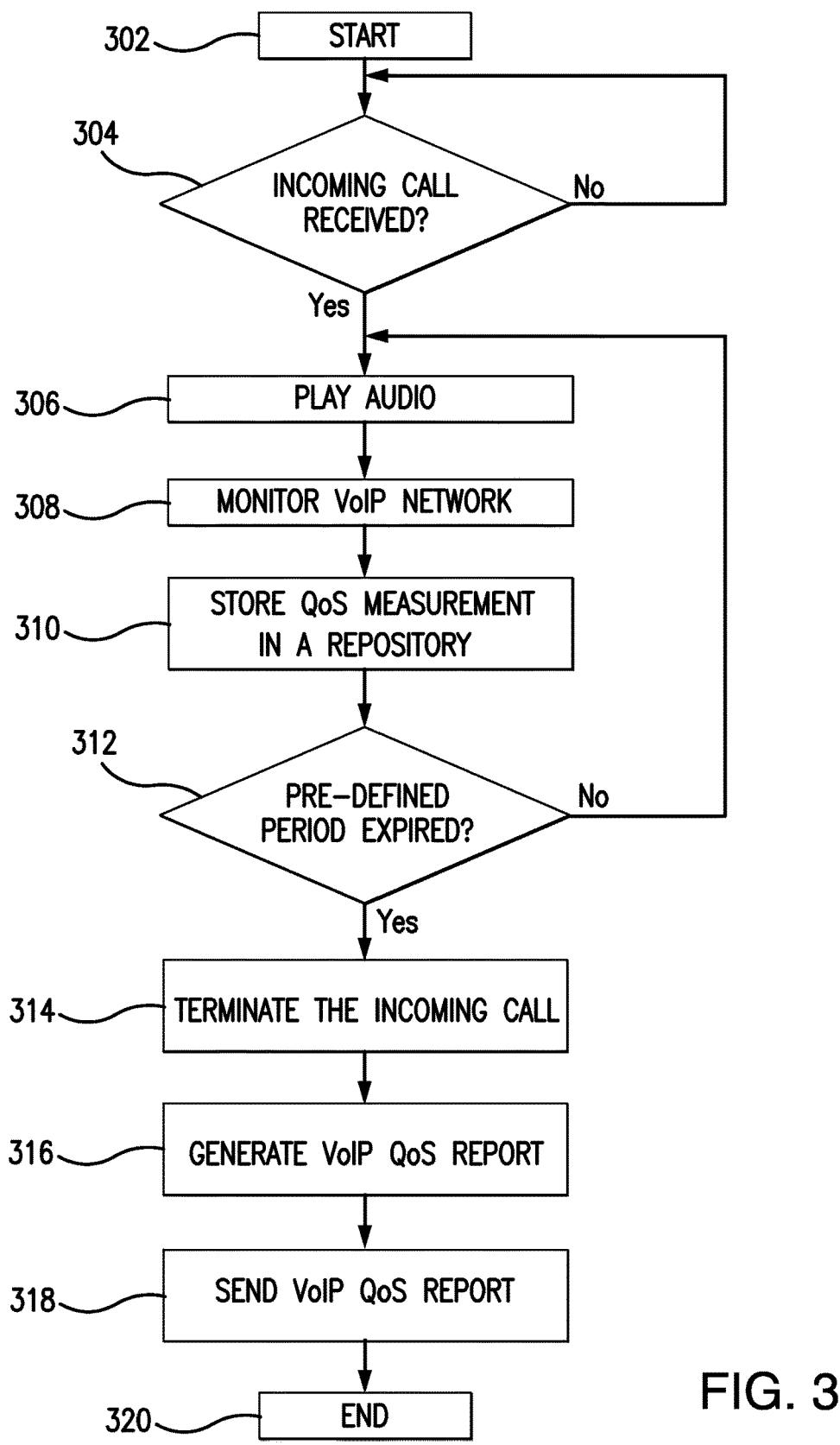
FIG. 3 depicts a flow diagram for a method for testing VoIP network in accordance with an embodiment of the present invention.

FIG. 3 shows an exemplary and non-limiting flowchart illustrating a method for testing VoIP network in accordance with certain illustrated embodiments. Before turning to description of FIG. 3, it is noted that the flow diagram in FIG. 3 shows example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included. The method for testing VoIP network may be executed on the monitoring probe 108 shown in FIG. 2.

The method begins at step 302 and proceeds to step 304. According to an embodiment of the present invention, the monitoring probe 108 is operative to receive incoming telephone calls from the VoIP network 102 which may be initiated by the tester device 122 (shown in FIG. 1). It is noted that the monitoring probe 108 is operative to act as an ordinary device connected to the VoIP network 102. In one embodiment, the monitoring probe 108 registers as an endpoint in the VoIP network 102. As previously noted, when the monitoring probe 108 is registered on VoIP network 102, provision is made to assign a unique identifier (i.e. phone number) to the monitoring probe 108, so as to make it possible for a VoIP test engineer or another user of the tester device 122 to place a phone call to the monitoring probe 108. According to an embodiment of the present invention, at step 304, the communication module 110 may periodically check if there are any incoming calls from the tester device 122 that should be accepted by the monitoring probe 108.

If an incoming call is received from the tester device 122 (decision block 304, yes branch), the communication module 110 answers the call and a VoIP communication session is established between the tester device 122 and the monitoring probe 108. In one embodiment, at step 306, the communication module 110 may optionally play a pre-recorded audio message. The audio message may contain music, words, or a variety of sounds as desired and are known in the art. The music or sounds emitted by the monitoring probe 108 may be activated by module other than by the communication module 110. Furthermore, in response to receiving an incoming call from the tester device 122, a notification is sent to the quality monitoring module 112 by the communication module 110.

According to an embodiment of the present invention, in response to receiving the notification from the communication module 110 and while the pre-recorded audio message is playing, at step 308, the quality monitoring module 112 may start collecting data on VoIP network events. This can include monitoring communications which are passing back and forth between the monitoring probe 108 and the tester device 122. The QoS monitoring may involve determining QoS parameters which reflect the user experience, e.g., voice and/or video quality or responsiveness of communication. Examples of such QoS parameters which can be monitored by the quality monitoring module 112 are a packet loss, jitter, packet latency, packet duplication, and/or adaptive media encoding (codec).

The quality monitoring module 112 may apply various suitable procedures for determining such QoS parameters. By way of example, for determining the packet loss number, the quality monitoring module 112 may identify packet losses on the basis of sequence numbers in the data packets of the user plane traffic of the session, e.g., sequence numbers as included in data packets of the RTP. For determining jitter, the quality monitoring module 112 may measure the timing of received data packets of the user plane traffic of the session, e.g., relative to a reference timing such as a synchronous timing reference representing the nominal packet timing of a media codec used for the session. For example, the nominal packet timing for the Adaptive Multi-Rate (AMR) audio codec may be 200 ms. For measuring packet delay, timestamps included in the data packets of the user plane data traffic of the session may be evaluated. The quality of an established VoIP session may also be determined based, at least in part, on a calculated mean opinion score (MOS). Although a MOS can be calculated subjectively by human test personnel, software has also been developed to automatically calculate a MOS for telephony communications that pass over the established communication session. The MOS may be calculated based on one or more of the measures of quality, such as those discussed above. The calculated MOS may be taken into account, along with other factors, to determine the overall quality offered by the VoIP network 102.

At least in some embodiments, at step 308, the collected data is analyzed by the quality monitoring module 112 to determine if problems may be occurring on the VoIP network 102. In various embodiments, the analysis step could take many different forms. In some instances, the analysis might be a comparison of an actual measured value or an average of measured values to some predetermined threshold value. In other instances, if a particular type of event has occurred, the fact that the event has occurred may be indicative of an actual or potential problem. In still other instances, a variety of different forms or items of data could be collected and analyzed together to determine if a problem has occurred or if one is likely to occur.

The collected and analyzed QoS measurement data may then be stored in the repository 116 by the quality monitoring module 112, at a next step 310. According to an embodiment of the present invention, the monitoring probe 108 may be pre-configured to terminate the established VoIP communication session and to terminate the performed VoIP QoS monitoring after a pre-defined period of time. In one embodiment, the pre-defined period of time may range from approximately 10 seconds to approximately 15 minutes. At step 312, the communication module 110 determines whether the pre-defined period, for example one minute, has expired. If no (decision block 312, no branch), a loop consisting of steps 306-310 is repeated to generate the next set of measurement data points for the VoIP network 102. If the pre-defined period is determined to have expired by the communication module 110 at step 312 (decision block 312, yes branch), the communication module 110 proceeds first to step 314 where the incoming call initiated by the tester device 122 is terminated, and then sends notifications to the quality monitoring module 112 and the report generation module 114 indicating that a monitoring session has been concluded.

In response to receiving the notification, at step 316, the report generation module 114 then generates a corresponding QoS report based on the data stored in the repository 116 at step 310. The QoS report indicates the QoS for the monitored VoIP session between the monitoring probe 108 and the tester device 122. According to an embodiment of the present invention, the generated QoS report may be sent to the tester device 122 via the communication module 110, for example (step 318). Various procedures may be used for efficiently receiving the QoS report. In some cases, the communication module 110 may send the QoS report as a text message. By way of example only, the user of the tester device 122 may receive a text message indicating that a call quality in a form of a MOS score associated with the monitored VoIP session is 3.2. Further, the communication module 110 may also send the QoS report to the tester device 122 as an email message. As mentioned above, according to some embodiments, the communication module 110 determines the specifications of the tester device 122 and transmits only those notifications which the tester device 122 is capable of receiving. If the tester device 122 is capable of receiving and presenting various types of QoS measurement parameters, the tester device 122 can be configured to display all parameters, or to display those parameters preferred by the user of the tester device 122. The method terminates at step 320.

In summary, various embodiments of the present invention disclose a novel approach to test a VoIP network that provides a number of advantages. In one aspect, software programming code embodying the present invention provides an ability to perform an on-demand test of the VoIP network 102 that is initiated via a mobile device, such as the tester device 122, by human test personnel. In another aspect, the test personnel has the ability to have the probe send the results of its monitoring operations, in a form of a text message containing a QoS report, automatically to the same device that initiated the test. In an alternative embodiment, the test personnel may get the generated QoS report as an immediate email showing the VoIP network 102 performance. Additionally, as yet another benefit of the disclosed embodiments, the monitoring probe 108 may log the call quality metrics in the centralized repository 116 for later reference.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for testing a Voice Over IP (VOIP) network, the system comprising:
    a monitoring probe connected to the VoIP network and included in a test system, the monitoring probe being configured to:
        answer an incoming call initiated by a mobile device that is not included in the test system and is transmitted via the VoIP network;
        monitor the VoIP network in response to receiving the incoming call;
        terminate the incoming call after a pre-defined period of time;
        determine message receiving specifications of the mobile device initiating the incoming call; and
        send a quality report indicative of VoIP network performance dependent upon the determined message receiving specifications of the mobile device initiating the incoming call.

2. The system as recited in claim 1, wherein the monitoring probe comprises a VoIP endpoint.

3. The system as recited in claim 1, wherein the monitoring probe is further configured to play an audio message in response to receiving the incoming call.

4. The system as recited in claim 1, wherein monitoring the VoIP network by the monitoring probe further comprises monitoring a VoIP session established between the monitoring probe and the mobile device to assess the VoIP session quality using one or more Quality of Service (QoS) measures associated with the established session.

5. The system as recited in claim 4, wherein the QoS measures include at least one of packet loss, jitter, packet latency, packet duplication, adaptive media encoding, or MOS in regard to the data exchanged during the established VoIP session.

6. The system as recited in claim 5, further comprising a data repository being operative to store at least some of the QoS measures associated with the established VoIP session.

7. The system as recited in claim 1, wherein the pre-defined period of time ranges from approximately 10 seconds to approximately 15 minutes.

8. The system as recited in claim 1, wherein the monitoring probe is further configured to send the quality report to the mobile device via a text message.

9. The system as recited in claim 1, wherein the monitoring probe is further configured to send the quality report to a user via an email message.

10. A monitoring probe connected to a VoIP network, the monitoring probe comprising:
    at least one circuit having executable logic and included in a test system; and
    a processor included in the test system, the processor configured to execute the logic, the logic, when executed, being configured to:
        answer an incoming call initiated by a mobile device that is not included in the test system and is transmitted via the VoIP network;
        monitor the VoIP network in response to receiving the incoming call;
        terminate the incoming call after a pre-defined period of time;
        determine message receiving specifications of the mobile device initiating the incoming call; and
        send a quality report indicative of VoIP network performance dependent upon the determined message receiving specifications of the mobile device initiating the incoming call.

11. The monitoring probe as recited in claim 10, wherein the monitoring probe comprises a VoIP endpoint.

12. The monitoring probe as recited in claim 10, wherein monitoring the VoIP network by the monitoring probe further comprises monitoring a VoIP session established between the monitoring probe and the mobile device to assess the VoIP session quality using one or more Quality of Service (QoS) measures associated with the established session.

13. The monitoring probe as recited in claim 12, wherein the QoS measures include at least one of packet loss, jitter, packet latency, packet duplication, adaptive media encoding, or MOS in regard to the data exchanged during the established VoIP session.

14. The monitoring probe as recited in claim 13, wherein the monitoring probe is further configured to store at least some of the QoS measures associated with the established VoIP session in a data repository.

15. The monitoring probe as recited in claim 10, wherein the monitoring probe is further configured to play an audio message in response to receiving the incoming call.

16. The monitoring probe as recited in claim 10, wherein the pre-defined period of time ranges from approximately 10 seconds to approximately 15 minutes.

17. The monitoring probe as recited in claim 10, wherein the monitoring probe is further configured to send the quality report to the mobile device via a text message.

18. The monitoring probe as recited in claim 10, wherein the monitoring probe is further configured to send the quality report to a user via an email message.

* * * * *